United States Patent
Illingworth et al.

(10) Patent No.: US 9,425,667 B2
(45) Date of Patent: Aug. 23, 2016

(54) ELECTRIC MOTOR

(71) Applicant: Brose Fahrzeugteile GmbH & Co. KG Wuerzburg, Wuerzburg (DE)

(72) Inventors: Richard Illingworth, Clarkston, MI (US); Milenko Stamenic, Unterhaching (DE); William Brehmer, Farmington Hills, MI (US); Marco Batzner, Holly, MI (US)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 504 days.

(21) Appl. No.: 14/068,699

(22) Filed: Oct. 31, 2013

(65) Prior Publication Data
US 2014/0339939 A1 Nov. 20, 2014

Related U.S. Application Data

(60) Provisional application No. 61/824,711, filed on May 17, 2013.

(51) Int. Cl.
 *H02K 5/10* (2006.01)
 *H02K 9/04* (2006.01)
 *H02K 5/12* (2006.01)
 *H02K 9/02* (2006.01)

(52) U.S. Cl.
 CPC ........... *H02K 5/10* (2013.01); *H02K 5/12* (2013.01); *H02K 11/33* (2016.01); *H02K 9/02* (2013.01); *H02K 9/04* (2013.01); *H02K 2205/09* (2013.01)

(58) Field of Classification Search
 CPC ............ H02K 5/10; H02K 5/12; H02K 9/02; H02K 9/04; H02K 11/33; H02K 2205/09
 USPC ......................................... 310/58, 66, 88, 89
 See application file for complete search history.

(56) References Cited

U.S. PATENT DOCUMENTS

| | | | | |
|---|---|---|---|---|
| 4,537,565 A * | 8/1985 | Edler | ................... | F04B 17/042 310/64 |
| 5,793,131 A * | 8/1998 | Fisher | ................... | H02K 17/30 200/81 R |
| 6,005,314 A * | 12/1999 | Fisher | ................... | H02K 17/30 310/66 |
| 8,047,813 B2 * | 11/2011 | Sevy | ..................... | F04B 43/04 310/15 |
| 2003/0176817 A1 * | 9/2003 | Chang | ................... | A61H 23/02 601/9 |
| 2010/0175609 A1 * | 7/2010 | Solow | .................... | G10K 9/04 116/142 FP |
| 2014/0339939 A1 * | 11/2014 | Illingworth | .............. | H02K 5/10 310/88 |

FOREIGN PATENT DOCUMENTS

WO WO 2013/037454 A2 3/2013

* cited by examiner

*Primary Examiner* — John K Kim
(74) *Attorney, Agent, or Firm* — Muncy, Geissler, Olds & Lowe, P.C.

(57) ABSTRACT

An electric motor having a housing with a housing interior and also with an electronics compartment for a motor electronics system is provided. The housing has a housing base and a housing wall. The electronics compartment is arranged between the housing wall and a housing cover. The housing cover has a ventilation opening for venting the housing interior. The electronics compartment has a ventilation channel which is routed into the housing interior via the housing wall and has a channel connection piece which issues into the ventilation opening of the housing cover and is closed by an air-permeable diaphragm.

12 Claims, 4 Drawing Sheets

ELECTRIC MOTOR

This nonprovisional application claims priority to U.S. Provisional Application No. 61/824,711, which was filed on May 17, 2013, and which is herein incorporated by reference.

BACKGROUND OF THE INVENTION

1. Field of the Invention

The invention relates to an electric motor having a housing with a housing interior for accommodating a stator and a rotor, which is arranged on a motor shaft so as to rotate with it, and also having an electronics compartment for a motor electronics system.

2. Description of the Background Art

WO 2013/037454 A2, which is incorporated herein by reference, discloses an electric motor which can be a constituent part of an actuator for a motor vehicle gearbox, in particular for a direct-shift gearbox (DSG). In the case of a hydraulic actuator, the electric motor can be used to drive a hydraulic pump.

Conventional electric motors typically have a cylindrical motor or stator housing in which a stator is arranged fixed to the housing and a rotor is arranged so as to rotate together with a motor shaft which is fixed to the rotor. In order to be coupled, for example, to the hydraulic pump of the actuator, the motor shaft is routed out on a housing side of the electric motor so as to form a shaft journal, whereas the opposite housing side has a connection flange for fastening the actuator, for example, to the direct-shift gearbox. Two such electric motors or actuators can also be associated with the direct-shift gearbox.

During operation of an electric motor of this kind, in particular when it is used as a gearbox actuator for a direct-shift gearbox (DSG) of a motor vehicle, it is frequently exposed to a damp environment. In such environmental conditions, there is a risk of moisture, for example water, entering the motor housing of the electric motor via the transmission system of the gearbox actuator. This is extremely undesirable, in particular, in respect of a risk of a short circuit in the region of the motor electronics system which is usually provided and is integrated in the motor housing and is used to control the electric motor.

SUMMARY OF THE INVENTION

It is therefore an object of the present invention to provide an electric motor which is particularly suitable, in particular, as a gearbox actuator. In an embodiment, the electric motor can be designed such that damage to motor components as a result of the ingress of moisture, such as water, is reliably avoided. In this case, the motor electronics system in particular should be protected against moisture in as reliable a manner as possible.

According to an embodiment of the invention, the electric motor has a housing with a housing interior for accommodating a stator and a rotor, which is arranged on a motor shaft so as to rotate with it, and also having an electronics compartment for a motor electronics system. The housing has a housing base and a housing wall which is arranged axially opposite the housing base. The housing interior for the stator and the rotor is formed between the housing base and the housing wall. The electronics compartment for the motor electronics system is arranged between the housing wall and a housing cover which closes the electronics compartment.

The housing cover has a ventilation opening for ventilating and/or venting the housing interior. A ventilation channel communicates with the ventilation opening in the housing cover, the ventilation channel extending through the electronics compartment in the axial direction and leading into the housing interior via the housing wall. In the region of the electronics compartment, the ventilation channel is formed by a channel connection piece or surrounded by the channel connection piece which issues into the ventilation opening in the housing cover. In the region of the channel connection piece, the ventilation channel is closed by means of a semi-permeable diaphragm. The diaphragm is a diaphragm which is impermeable to moisture and, in particular, water, but can be permeable to air.

The ventilation channel with the semi-permeable diaphragm therefore allows ventilation and venting of the housing interior and, possibly additionally, further components of a gearbox actuator when moisture has entered the gearbox actuator or the electric motor.

In an embodiment, the channel connection piece can be integrally formed on the housing wall. In practice, the housing wall serves to close the housing interior on the housing side which is averted from the housing base. In practice, the housing wall forms the housing wall of the electronics compartment, which is closed by the housing cover, on the opposite wall side.

The motor shaft, which carries the rotor of the electric motor such that they rotate together, is mounted within the housing interior in the region of the two shaft ends. In this case, one of the shaft bearings is arranged in the region of the housing base, while the other shaft bearing is arranged in the region of the housing wall. Therefore, in practice, the housing wall can additionally form the end plate, which faces the housing compartment, of the electric motor.

The channel connection piece, which can be integrally formed on the housing wall, of the ventilation channel extends in the axial direction, across the electronics compartment, as far as the ventilation opening in the housing cover. At the free end, that is to say at the connection piece opening which faces the housing cover, the channel connection piece is provided with a seal in order to reliably seal off the channel connection piece and therefore the ventilation channel from the motor housing in the region of the housing cover. In this case, the seal can be designed as an axial seal.

The seal can also be designed as a so-called radial seal. For this purpose, the outside of the channel connection piece can be designed to be preferably conical or in the form of a truncated cone. In this case, the channel connection piece tapers in the direction of the ventilation opening in the housing cover in such a way that the channel connection piece at least slightly enters the ventilation opening by way of its free-end-side connection piece opening and, by way of its connection piece outer side, is positioned against the opening wall or opening edge of the ventilation opening in the housing cover in a sealing manner. In practice, the free-end-side connection piece opening in the channel connection piece is pressed into the ventilation opening in a sealing manner when the housing cover is fitted.

The inner wall of the channel connection piece can also be designed in a conical manner. The corresponding internal cone then widens in the direction of the ventilation opening in the housing cover. This enables simple and reliable insertion of the semi-permeable diaphragm into the channel connection piece. To this end, the diaphragm itself can be designed in a conical manner or in the manner of a truncated cone.

In a further embodiment, the channel connection piece has a radially running partition wall with at least one passage opening. The partition wall preferably serves as an abutment surface for the diaphragm, wherein the opening in the partition wall ensures reliable ventilation or venting of the electric motor or of the gearbox actuator. In addition, the channel connection piece can have an axially running internal web which extends into the housing interior. The internal web can perform a stabilization function or else a supporting or carrying function for motor parts of the electric motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
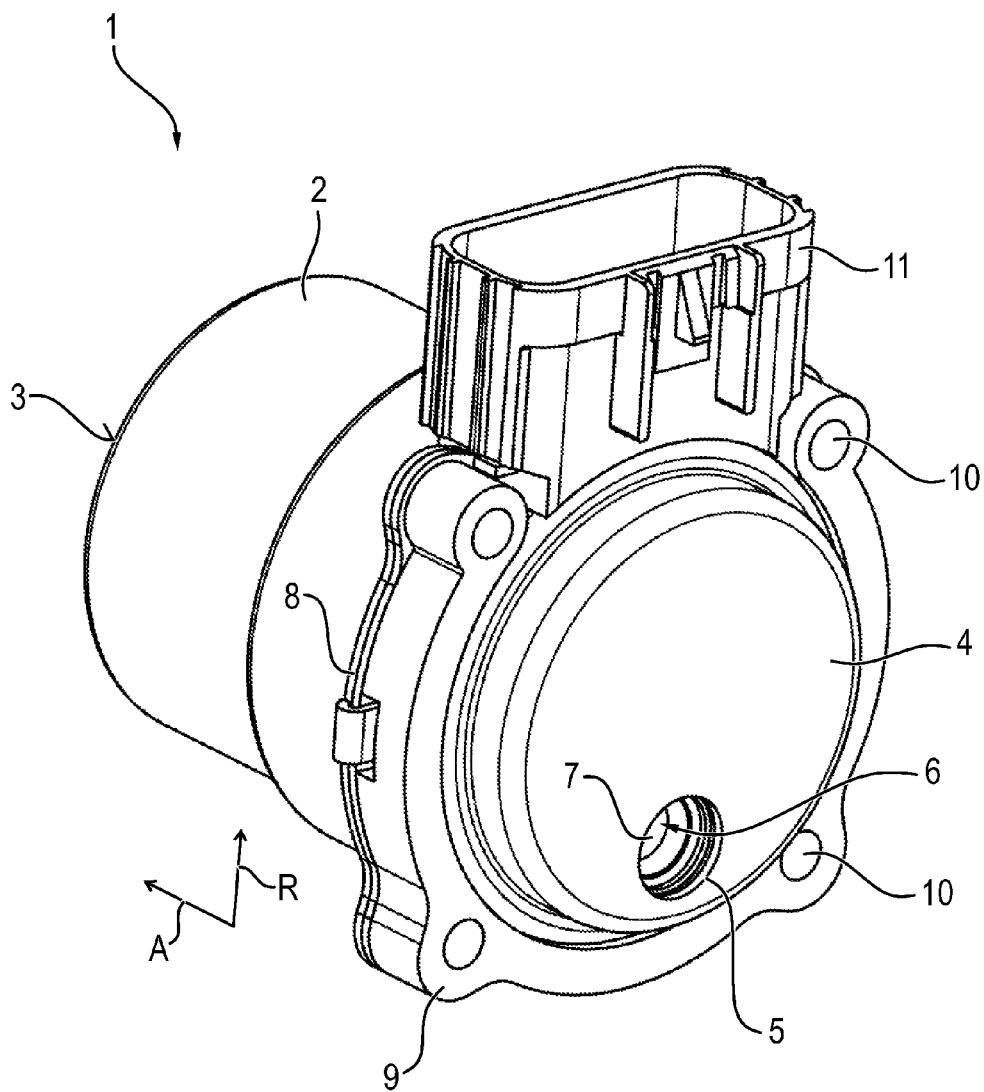
FIG. 1 shows a perspective illustration of an electric motor having a housing and having a housing cover with a ventilation opening.

FIG. 1 shows an electric motor 1 having a substantially cylindrical motor housing 2 with a housing base 3 and with a housing cover 4. The housing cover 4 is located on an end of the electric motor 1 which is situated axially opposite the housing base 3. There is a ventilation opening 5 in the housing cover 4. A ventilation channel 6 which runs in the axial direction A adjoins the ventilation opening. The ventilation channel is closed via a semi-permeable diaphragm 7 which is permeable to air but is impermeable to moisture and, in particular, water.

Figure 2:
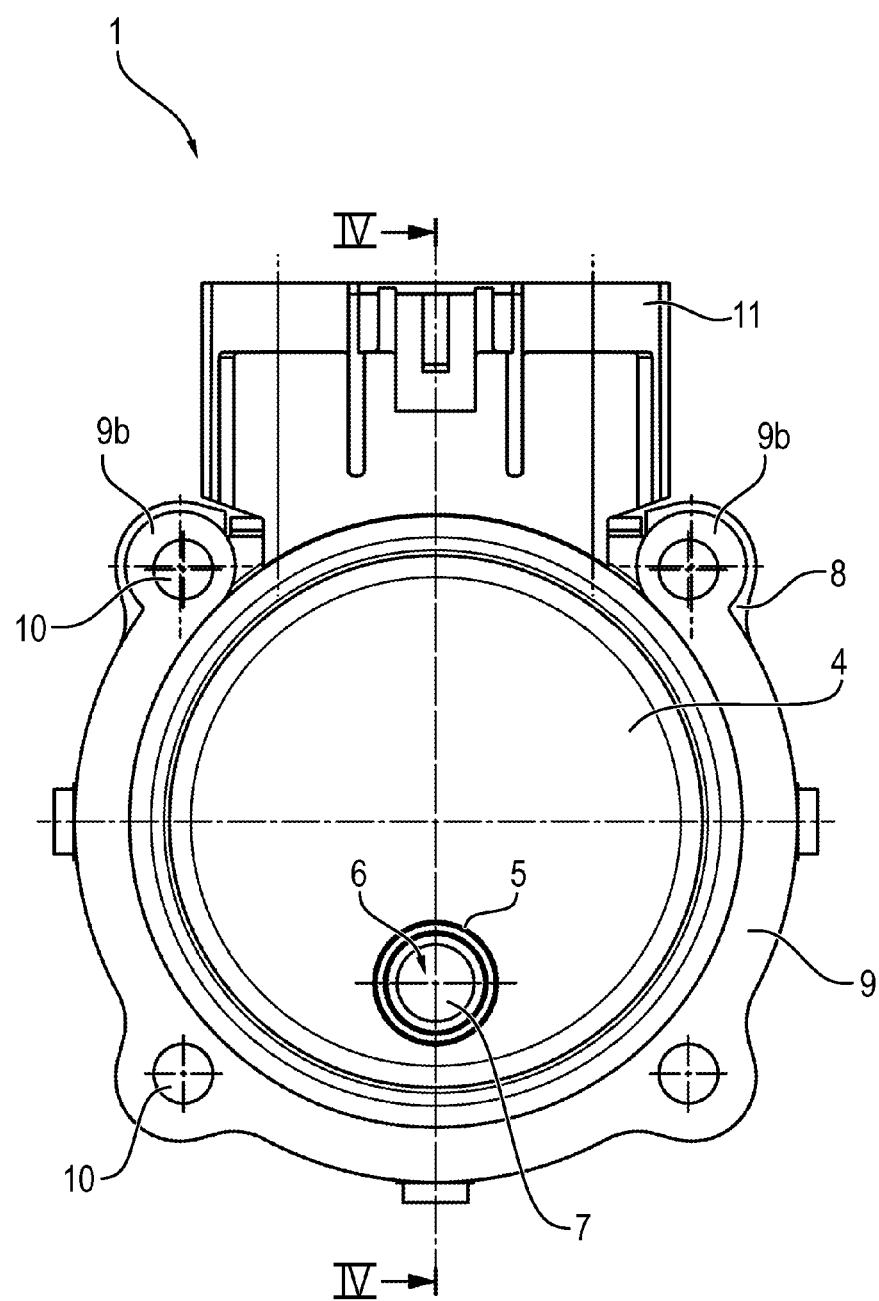
FIG. 2 shows an end view of the electric motor according to FIG. 1 looking at the housing cover and the ventilation opening.

As can also be seen in FIG. 2, a flange region of the electric motor 1 adjoins the housing cover 4 in the axial direction A by way of a housing flange 8 in which a flange ring 9 which is only partially closed is positioned. Flange openings 10 serve to receive flange screws (not illustrated) for fastening the electric motor 1, for example, to a direct-shift gearbox (DSG) of a motor vehicle.

Figure 3:
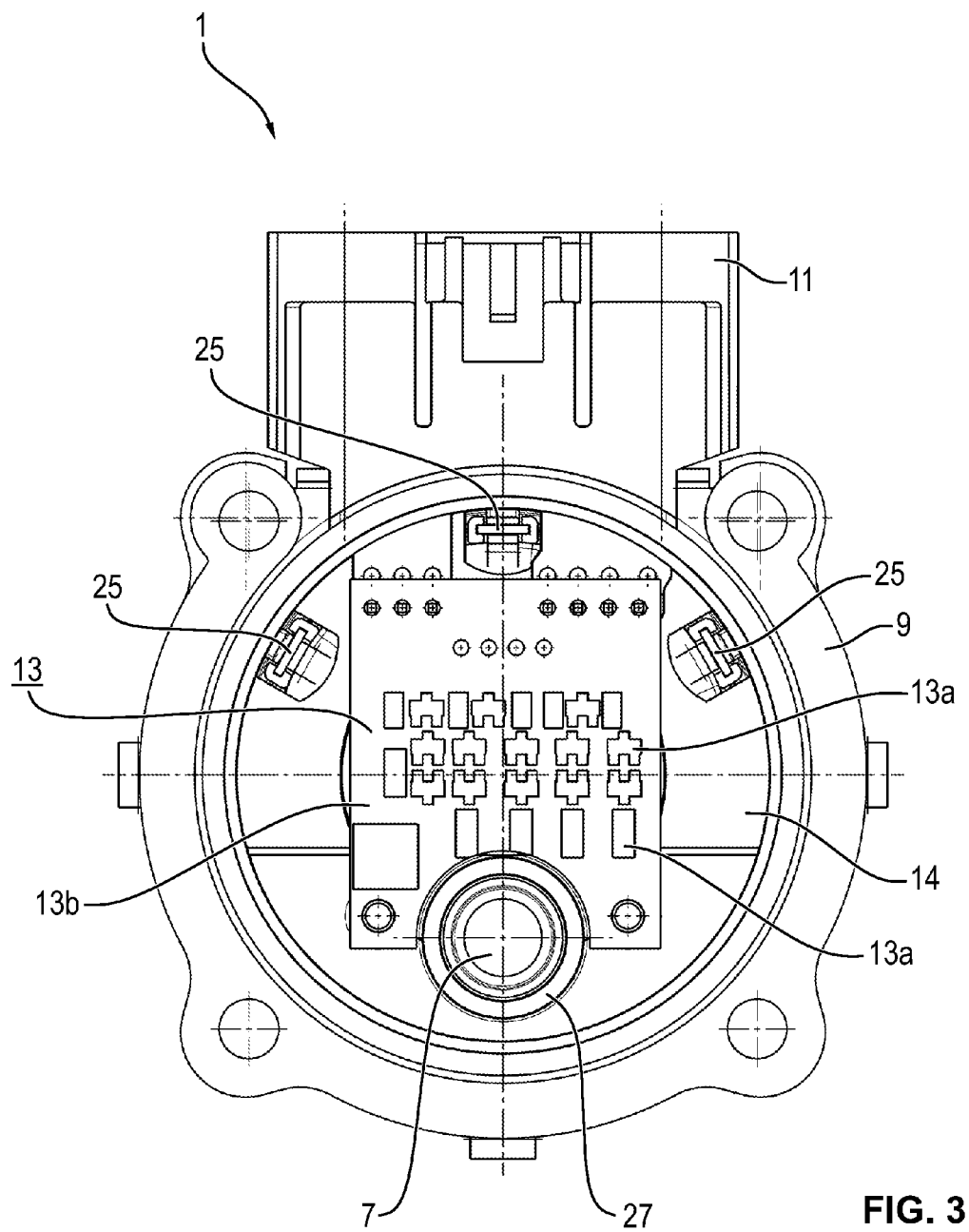
FIG. 3 shows the electric motor according to FIG. 2 without a housing cover, looking into an electronics compartment with the channel connection piece for accommodating a diaphragm being arranged therein.
Figure 4:
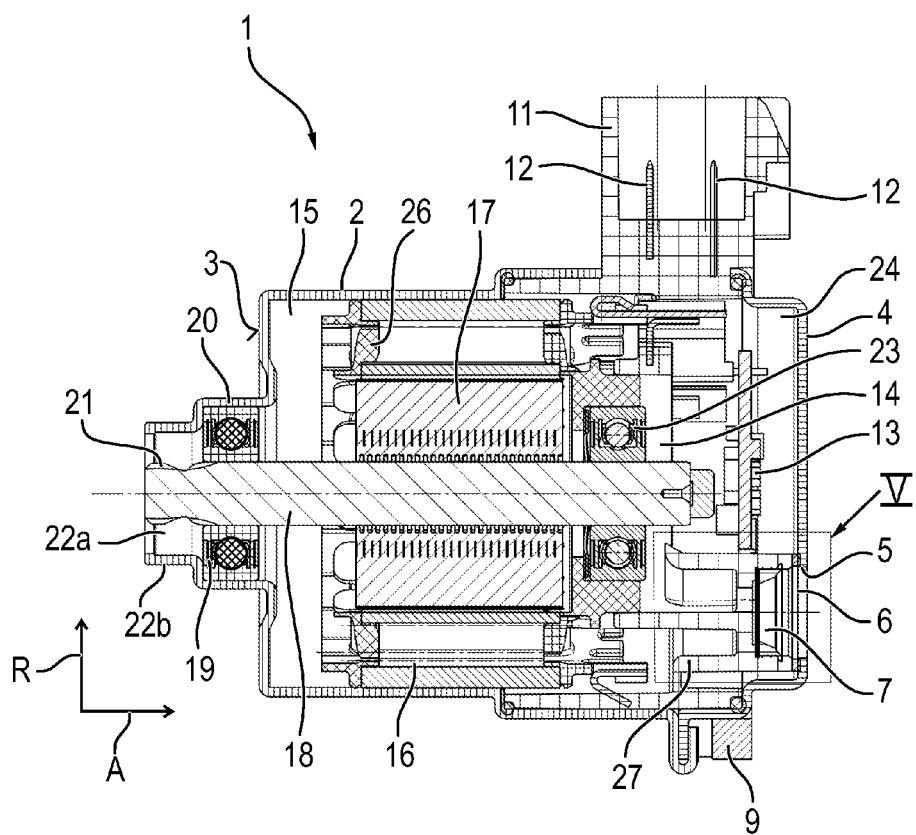
FIG. 4 shows a longitudinal section along line IV-IV in FIG. 2 of the electric motor with a ventilation channel, which is surrounded by the channel connection piece in the region of the electronics compartment, to the housing interior of the electric motor.

A connection housing 11 for plug connections 12 of a motor electronics system 13, which is illustrated in plan view in FIG. 3 and in cross section in FIG. 4, extends between the flange limbs 9a and 9b of the flange ring 9 in the radial direction R.

As can be seen in FIGS. 3 and 4, a housing interior 15 is formed between the housing base 3 and a housing wall 14 which is situated axially opposite the housing base. The housing interior contains a stator 16 which is fixed to the housing and a rotor 17 which is surrounded by the stator and is fitted on a motor shaft 18 so as to rotate with it. The motor shaft 18 is mounted in a rotatable manner in the region of the housing base 3 in a first bearing 19 which is designed as a ball bearing in the exemplary embodiment. The bearing 19 is fitted in a bearing pot 20 which is drawn from the housing base 3, for example using a so-called deep-drawing process. The motor shaft 18 projects beyond this bearing 19 and out of the motor housing 2 in the axial direction A by way of a shaft connection piece 21. The shaft journal 21 is surrounded by a cylindrical housing section 22b in the region of a base-side housing opening 22a, the housing section 22b preferably likewise being formed from the material of the housing base 3 using a deep-drawing process.

The motor shaft 18 is rotatably mounted in a further bearing 23, which is preferably likewise designed as a ball bearing, within the housing interior 15. This second bearing 23 is located behind or beneath the housing wall 14 in the axial direction A. The housing wall 14 can therefore perform the function of an end plate.

An electronics compartment 24 for accommodating the motor electronics system 13 is located in the region between the housing wall 14 and the housing cover 4. Winding ends or connections 25 of a motor winding 26, which is on the stator in the exemplary embodiment, the winding ends or connections being routed through the housing wall 14, project into the electronics compartment 24. The winding ends 25 are electrically connected to the motor electronics system 13. The motor electronics system 13 substantially comprises a printed circuit board 13b which is populated with electronic components 13a. The electronic components 13a can comprise semiconductor or power switches for driving the motor winding 26 and therefore for controlling the brushless electric motor 1.

Figure 5:
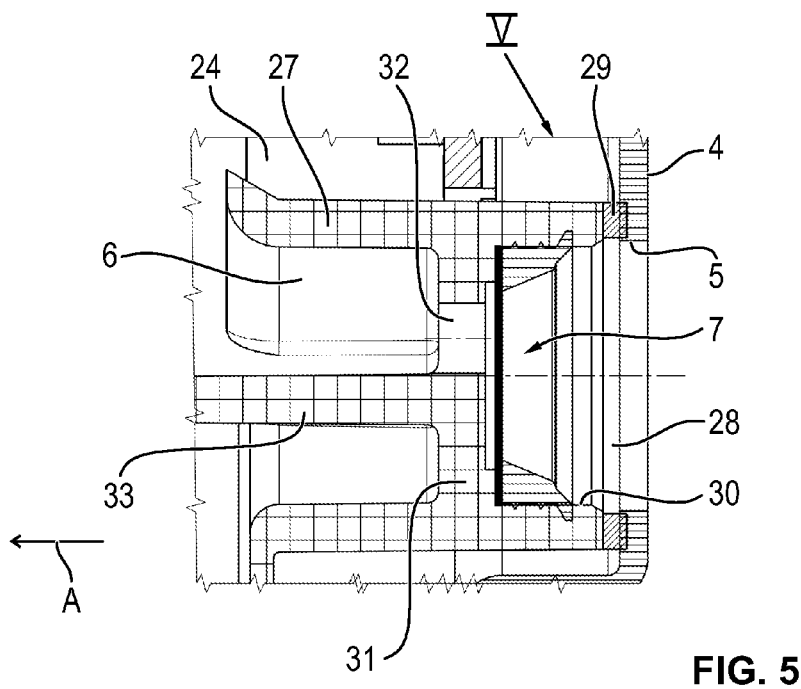
FIG. 5 shows a detail V from FIG. 4 on an enlarged scale with the channel connection piece, which runs in the electronics compartment, with the diaphragm inserted therein.

As can be seen comparatively clearly from FIG. 5, the ventilation channel 6 is formed by a channel connection piece 27 or surrounded by the channel connection piece at least within the electronics compartment 24. This channel connection piece 27 is preferably integrally formed on the housing wall 14. The connection housing 11 for the plug connections 12 is also suitably integrally formed on the housing wall 14. The housing wall 14 is suitably composed of a plastic, whereas the motor housing 2 is suitably produced from a metal sheet, for example using the deep-drawing process.

The channel connection piece 27 has a mouth region 28 which faces the housing cover 4 and is sealed off from it. To this end, an axial seal 29 in the form of a sealing ring is sealed off from the housing cover 4. The inner wall of the channel connection piece 27 is of conical design in the mouth region 28 which adjoins the ventilation opening 5 in the housing cover 4 in the axial direction A. In this case, this conical inner wall 30 tapers in the direction of a radial partition wall 31 which is arranged within the channel connection piece 27 and is integrally formed with it. As can be seen comparatively clearly in FIG. 5, the partition wall 31 of the channel connection piece 27 can also be designed in a stepped manner in the axial direction A.

At least one passage or wall opening 32 is made in the radial partition wall 31 of the channel connection piece 27.

The motor interior 15 of the electric motor 1 is ventilated and/or vented via the opening. Furthermore, an axially running internal web 33 is integrally formed on the channel connection piece 27. The internal web extends into the housing interior 15. There, the axial internal web 33 can perform supporting, carrying or abutment functions.

The ventilation channel 6 with the air-permeable diaphragm 6 inserted therein allows the electric motor 1 to be ventilated and vented in a reliable manner via its housing cover 4 which closes the housing 2 usually in a sealed manner. In this case, the motor electronics system 13 which is to be protected against moisture is reliably separated from the housing interior 15 by means of the channel connection piece 27 of the ventilation channel 6, with the result that the motor electronics system 13 is also reliably protected against a venting stream which carries moisture.

If the electric motor 1 is, as intended, coupled, for example, to a hydraulic pump for forming a gearbox actuator for a direct-shift gearbox of a motor vehicle by means of the shaft journal 21, the ventilation channel 6 can ventilate and vent the entire gearbox actuator via the channel connection piece 27 and the ventilation opening 5 in the housing cover 4. As a result, all components of the gearbox actuator are reliably protected against the consequences of any ingress of moisture and in particular against the consequences of the ingress of water.

The invention is not restricted to the above-described exemplary embodiment. Rather, other variants of the invention can also be derived from the exemplary embodiment by a person skilled in the art, without departing from the subject matter of the invention. In particular, all the individual features described in connection with the exemplary embodiment can also be combined with one another in a different way, without departing from the subject matter of the invention.

For example, the outer wall of the channel connection piece 27 which extends through the electronics compartment 24 in the axial direction A can also be conical or in the form of a truncated cone. If the conical channel connection piece 27 tapers in the direction of the ventilation opening 5 in this case, the opening collar of the channel connection piece can hold the channel connection piece 27 in the mouth region 28 in an interlocking and force-fitting manner as the housing cover 4 is mounted on the housing 2. In this embodiment, the channel connection piece 27 is sealed off from the housing cover 4 by means of a radial seal.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electric motor comprising:
 a housing with a housing interior for accommodating a stator and a rotor, which is arranged on a motor shaft so as to rotate with the rotor; and
 an electronics compartment for a motor electronics system;
 wherein the housing has a housing base and a housing wall which is arranged axially opposite the housing base,
 wherein the electronics compartment for the motor electronics system is arranged between the housing wall and a housing cover that closes the electronics compartment,
 wherein the housing cover has a ventilation opening for venting the housing interior, and
 wherein the electronics compartment has a ventilation channel that is routed into the housing interior via the housing wall and that has a channel connection piece that issues into the ventilation opening in the housing cover and is closed by an air-permeable diaphragm.

2. The electric motor as claimed in claim 1, wherein the diaphragm is arranged in the channel connection piece.

3. The electric motor as claimed in claim 1, wherein the channel connection piece extends between the housing wall and the ventilation opening in the housing cover.

4. The electric motor as claimed in claim 1, wherein the channel connection piece is integrally formed on the housing wall.

5. The electric motor as claimed in claim 1, wherein the channel connection piece has an internal cone that widens in a direction of the ventilation opening in the housing cover.

6. The electric motor as claimed in claim 1, wherein a seal is provided between the channel connection piece and the ventilation opening in the housing cover.

7. The electric motor as claimed in claim 1, wherein the channel connection piece has a radially running partition wall with at least one wall opening.

8. The electric motor as claimed in claim 1, wherein the channel connection piece has an axially running internal web.

9. The electric motor as claimed in claim 8, wherein the internal web of the channel connection piece extends into the housing interior.

10. The electric motor as claimed in claim 1, wherein a connection housing for plug connections of the motor electronics system is integrally formed on the housing wall.

11. The electric motor as claimed in claim 1, wherein the housing, on a housing side which is averted from the housing base, has a housing flange for connection to a gear mechanism, in particular to a direct-shift gearbox or dual-clutch gearbox of a motor vehicle.

12. The electric motor as claimed in claim 1, wherein the motor shaft is routed out of the housing via a housing opening which is provided in the housing base.

* * * * *